US006850816B2

(12) United States Patent
Garratt

(10) Patent No.: US 6,850,816 B2
(45) Date of Patent: Feb. 1, 2005

(54) METHOD TO ACTIVATE A VENDING MACHINE

(76) Inventor: Scott Edward James Garratt, c/o Kanes Distributing Ltd., 115 Dieppe Road, St. Catharines, Ontario (CA), L2M 7N6

( * ) Notice: Subject to any disclaimer, the term of this patent is extended or adjusted under 35 U.S.C. 154(b) by 0 days.

(21) Appl. No.: 10/415,406

(22) PCT Filed: Aug. 9, 2002

(86) PCT No.: PCT/CA02/01236

§ 371 (c)(1), (2), (4) Date: Apr. 29, 2003

(87) PCT Pub. No.: WO03/014858

PCT Pub. Date: Feb. 20, 2003

(65) Prior Publication Data

US 2004/0089669 A1 May 13, 2004

(30) Foreign Application Priority Data

Aug. 9, 2001 (CA) ............................................ 2354896

(51) Int. Cl.[7] ................................................ B65G 17/00
(52) U.S. Cl. ........................ 700/237; 700/241; 255/410
(58) Field of Search ................................ 700/237, 231, 700/232, 241

(56) References Cited

U.S. PATENT DOCUMENTS 6,529,801 B1 * 3/2003 Rosenblum ................. 700/237
6,584,309 B1 * 6/2003 Whigham ................ 455/414.1

FOREIGN PATENT DOCUMENTS

| | | | |
|---|---|---|---|
| DE | 4225943 | | 2/1994 |
| DE | 20014381 | | 11/2000 |
| EP | 0935041 | | 8/1999 |
| EP | 1316929 | | 6/2003 |
| WO | WO9922346 | * | 5/1999 |
| WO | WO0038443 | * | 6/2000 |
| WO | 0145058 | | 6/2001 |
| WO | 0159725 | | 8/2001 |

* cited by examiner

*Primary Examiner*—Khoi H. Tran
(74) *Attorney, Agent, or Firm*—Ridout & Maybec LLP; W. Charles Kent

(57) ABSTRACT

A method of activating a vending machine or automatic dispenser of products or services, comprising an authorization acceptance means that operates in the machine or dispenser and an authorization issuance means that operates in a computer or calculating device remote from said machine or dispenser, wherein the issuance means produces a seemingly random code that will be accepted by the acceptance means to authorize the vending of a product or service.

21 Claims, 2 Drawing Sheets

Customer Process to obtain the Sequence from the Remote Calculating Device

Events occurring in the Remote Calculating Device that is using the same synchronous math function (algorithm or lookup table) as is being used in the vending machine to produce a valid solution and that solution when entered into the vending device, delivers a product or service.

Customer Process to obtain the Sequence from the Remote Calculating Device

Events occurring in the Remote Calculating Device that is using the same synchronous math function (algorithm or lookup table) as is being used in the vending machine to produce a valid solution and that solution when entered into the vending device, delivers a product or service.

Figure 2. Customer Input Process at the Automatic Dispenser (Vending Machine)
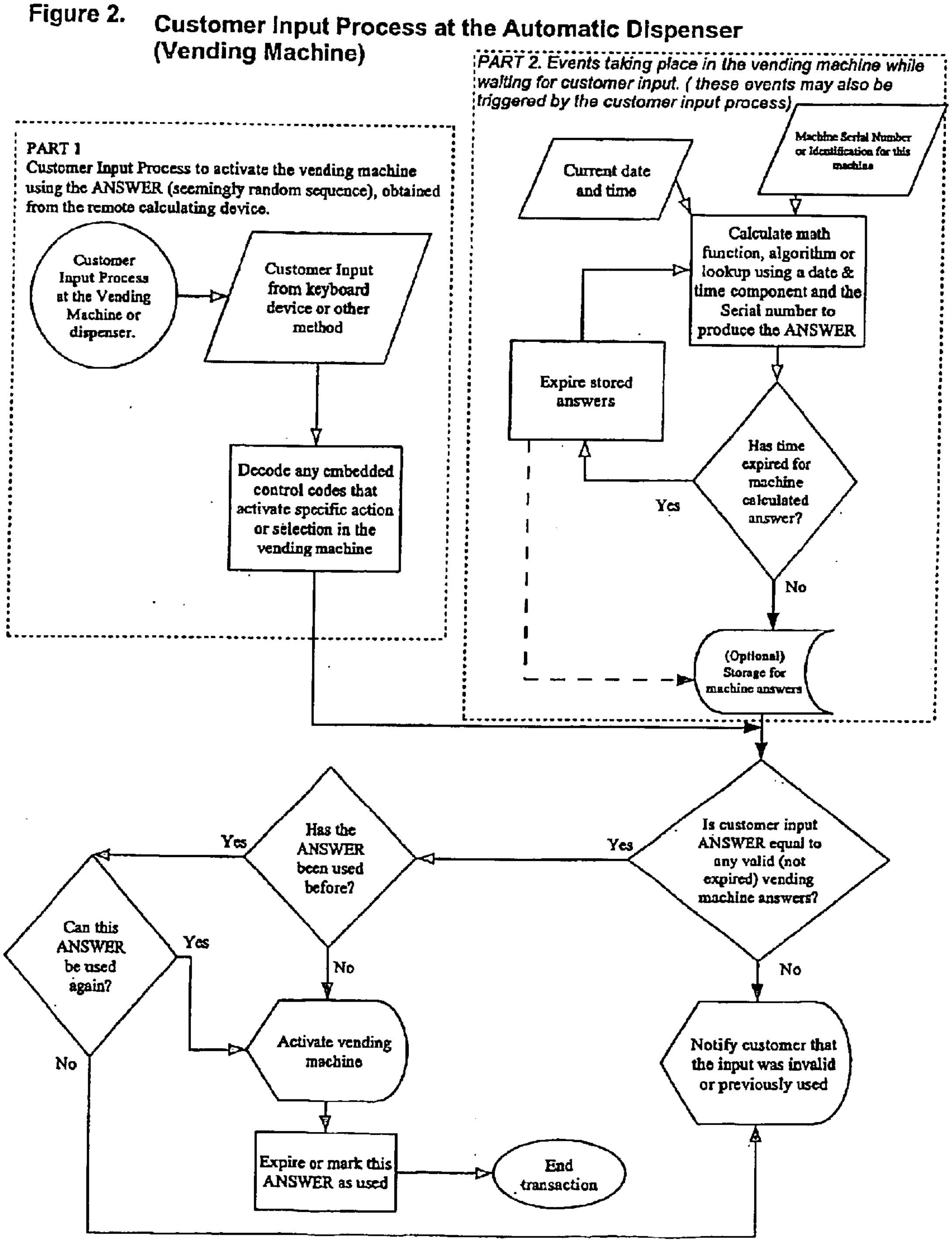

METHOD TO ACTIVATE A VENDING MACHINE

FIELD OF THE INVENTION

The present invention relates to a method for activating a vending machine or any other type of automatic dispenser of products and services using seemingly randomly generated numeric or alphanumeric sequences, or other code, provided at a remote location.

BACKGROUND OF THE INVENTION

As we move to a cashless society, a need has arisen to simplify the purchase of products and services from vending machines and other types of automatic dispensers, including amusement devices, gates, turnstiles and other secure portals. Most of these dispensers and machines currently require the use of tokens, currency, coupons, credit cards or other means by credit or debit in order to operate. However, some are also set up to accept account numbers and/or passwords as well. An example of such a dispenser is disclosed in Canadian Patent No. 2,323,673 to Freedompay Inc., which teaches a method and apparatus for tokenless vending, wherein the purchaser can input an account number and corresponding password onto a keypad at a vending machine. The vending machine then transmits the information to a central server to verify the password and the account number and available credit and then the product is dispensed.

With many recent changes and advances in technology, our society has become increasingly reliant upon telephones, cellular phones, hand-held and portable computers, and other similar devices. As a result of our increased reliance on these devices, and as a result of our movement towards becoming a cashless society, there is a growing need for consumers to be able to use these devices to access goods and services from vending machines and other automatic dispensers in a convenient, secure and efficient manner, without the need to carry around currency or other alternative forms of credit.

SUMMARY OF THE INVENTION

In accordance with the present invention, a method of activating a vending machine, amusement device or other automatic dispenser such as a turnstile, parking access gate, or other secure portal is provided. The method uses a synchronous math function, algorithm or look-up table, which runs, in both a vending machine or automatic dispenser and in a separate unconnected and remotely located computer or calculating device. The synchronous math function, algorithm or look-up table produces a solution that is identical in the machine or the dispenser and the computer or calculating device at any time it is calculated. As the solution changes every minute, or less, the solution would seem to be a random numeric or alphanumeric sequence to the customer or casual observer.

The solution is obtained by a consumer from the remote computer or calculating device and then input into the intended machine or dispenser to initiate a process or reaction that vends, operates, triggers or otherwise delivers a product or service. Customers can obtain the solution from the remotely located computer or calculating device by using a telephone, a cellular phone, or a hand-held computer or a similar device. The solution may also be obtained in person directly from the remotely located computer or calculating device or from an attendant maintaining control of the computer or device. Once the solution is obtained, the customer enters it into the vending machine or the automatic dispenser either manually or by using a telephone, cellular phone, hand-held computer or similar device.

The math function or lookup table that produces the seemingly random numeric or alphanumeric solution ensures that a high level of security is maintained, as the correct solution cannot readily be detected by repeated trial attempts and once used cannot be used again for a predetermined amount of time. Moreover, the solution may be made to cease to activate the machine if not entered into the machine after a predetermined length of time. Additionally, no communication link between the remote computer and the machine is required and products and services can be accessed without the use of tokens, coupons, currency or account numbers. Thus, the need for using credit of any kind is eliminated and the machine or dispenser can be activated by customers in a secure, efficient and convenient manner.

Accordingly, the invention comprises a method of activating a vending machine or automatic dispenser of products or services, comprising an authorization acceptance means that operates in the machine or dispenser and an authorization issuance means that operates in a computer or calculating device remote from said machine or dispenser, wherein the issuance means produces a seemingly random code that will be accepted by the acceptance means to authorize the vending of a product or service. The invention also comprises a method of activating a vending machine or automatic dispenser of products or services, comprising the steps of: providing at least one dispensing device; providing a remotely located calculating device; running a first synchronous math function or lookup table in the said at least one dispensing device to produce a solution and running a second synchronous math function or lookup table in the said remotely located calculating device to produce a solution, the said first solution and the said second solution being identical to one another; conveying the second solution running in the remotely located calculating device to a purchaser; receiving the second solution from the purchaser at the at least one dispensing device; confirming at the at least one dispensing device that the second solution is identical to the first solution; and activating the dispensing device to dispense the product or service.

BRIEF DESCRIPTION OF THE DRAWINGS

These and other advantages of the invention will become apparent upon reading the following detailed description and upon referring to the drawings in which:

FIG. 2 is a flow chart which shows the events occurring in the dispenser or a peripheral device attached thereto when a customer inputs the answer into an attached keypad or other input device.

Figure 1:
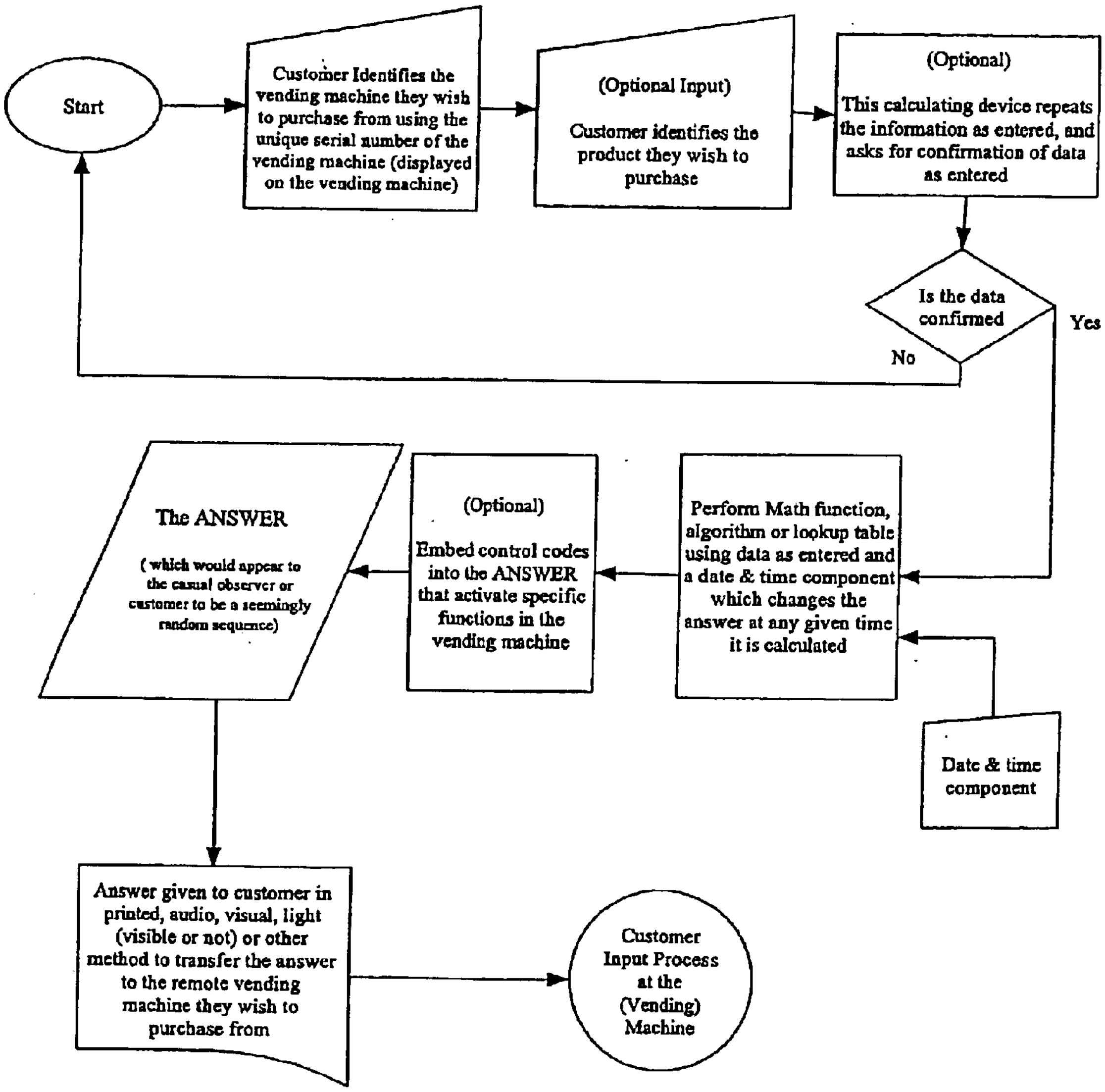
FIG. 1 is a flow chart which shows the events and process for a customer to obtain the solution from the remote calculating device that is using the same synchronous math function, algorithm or lookup table as in the equipment to be actuated.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

The present invention uses a remotely located computer or calculating device, a vending machine or automatic dispenser equipped with a controller, an input device and a seemingly randomly generated numeric or alphanumeric sequence which is the solution to a math function, algorithm or look-up table and a serial number and a date and time component. The math function, algorithm or look-up table runs in a vending machine or other dispenser and in a remotely located computer or other calculating device at the same time. The customer obtains the solution from the remote location, and inputs this solution into the controller of a vending machine or automatic dispenser using an input device and the controller then activates the intended machine or dispenser to dispense a particular product or service.

FIG. 1 illustrates the sequence of events occurring at the remote calculating device where the customer would receive the current solution that would activate the dispenser they wish to obtain a product or service from. The customer first identifies the dispenser and optionally the actual product the customer wishes to obtain. The customer may identify the machine or dispenser by its location or by a unique serial number that is located on the machine or dispenser. The customer then provides this information to the remote computer or similar calculating device (or an attendant in control of the remote computer or calculating device.) The remote calculating device can at this time request confirmation of the information provided by the customer before using the information in is calculation. The computer or remote calculating device calculates a solution using the information provided by the customer and using algorithms that are the same as those operating in the machine or dispenser the customer wishes to obtain product or service from. The solution is composed of: 1) a secret math function or lookup table 2) the unique serial number of the machine and 3) the current time lapse from a given starting point (time), to calculate a number which is a numeric, alphanumeric binary or digital solution of the components. By way of example, assuming the function or algorithm is generated at 10:14 a.m. on August 17, the unique serial number of the machine or dispenser is 123, and the function is 2+2, the math could be (2+2)+123+1014+0817=1958. The completed and final answer, or sequence, is then conveyed to the customer, in one of a number of possible ways. For example, where an employee or attendant is within walking distance of the vending machine or dispenser, the attendant or employee can control the remotely located computer or calculating device and provide the final sequence to the customer verbally, in the form of a printed receipt or in any other form which would be suitable for inscribing the sequence onto a media or device. The customer may also use a telephone, a cellular phone, a radio device or a wired intercom system to obtain the sequence either directly from the remotely located computer or from an attendant. The customer can now enter the solution in a different process at the machine or dispenser FIG. 2 Part 1 illustrates the sequence of events occurring in the machine or dispenser when a customer initiates input of the answer previously obtained from the remote calculating device. FIG. 2 Part 2 illustrates the sequence of events occurring in the machine or dispenser while waiting for customer input or alternatively this calculation process can be made to start only when customer input is detected. Customer input can be achieved in any number of possible ways.

Referring to FIG. 2; After the solution, as previously provided by the remote calculating device, is input into the machine or dispenser the customer wishes to obtain product or service from, the machine or dispenser determines whether the answer as input is valid or not. The machine or dispenser knows its own unique serial number and it has a synchronized date and clock value, and the machine or dispenser has the same math function or lookup table as operating in the remote calculating device, as such, the machine or dispenser knows its own answer. The answer, as entered by the customer, is compared to the answer, as calculated or stored by the machine or dispenser, and if correct allows the customer to obtain the product or service, and if invalid denies the customer request.

After the solution, as previously provided by the remote calculating device, is obtained, it is input into the vending machine or the automatic dispenser. This step is illustrated in FIG. 2 Part 1, and can be accomplished in one of a number of possible ways. Most vending machines and dispensers are equipped with a controller, which may be either a peripheral device or a software code embedded into the vending machine or dispenser. If a software code is installed directly into the vending machine or dispenser, the controller may actually be the machine or dispenser itself. The controller activates a machine or dispenser to deliver a particular product or service. Thus, an input device of some kind is required in order to enable a customer to provide the controller with the solution to the math function that would activate the machine or dispenser to deliver the requested products or services.

The input device can be a keypad or switch assembly attached to the controller which allows the consumer to enter the sequence into the controller directly or the input device may also be a telephone, a cellular phone, a radio, a voice recognition device, or a hand-held computer or similar device. After obtaining the sequence from the remotely located computer or calculating device, the sequence could be entered on a handheld computer or similar device that then transmits the answer to the controller using a built in infrared transmitter. The sequence could also be sent to the controller in an audible tone format from a cellular phone or similar radio device which transfers the answer in an audio format when the customer holds the phone or device in close proximity to a listening device on the controller that recognizes the tone feed or audio output emanating from the phone or radio. Alternatively, the sequence could be spoken to the controller, where the controller is equipped with voice recognition hardware or software to interpret the sequence as spoken by the customer. Finally, the sequence could be sent to the controller by the customer in a radio wave format from any device operated by the customer having radio transmission capabilities.

If the solution that is entered by the customer is invalid, the vending machine or automatic dispenser or a peripheral device attached thereto notifies the customer that the sequence as entered is invalid. The customer is then invited to try again or report the problem. If the sequence as entered is valid, and if control codes or hidden instructions had been embedded in that sequence that provides a specific product or service from a machine capable of dispensing a plurality of products; the control code would determine what specific product or service is to be delivered and the action that was embedded in the separated control code can be processed and the machine or dispenser is activated and the customer receives the selected product or services.

As the sequence is the answer to a reasonably complex combination of algorithms, unique serial numbers, embedded control codes, and a date and time component, a reasonable level of security can be maintained in that the sequence cannot be readily detected by repeated trial attempts. As the answer is never the same at two different dates and times, it would appear to be a randomly generated number to the casual observer. Once used, the sequence cannot be used again for a predetermined length of time and it can be made to cease to actuate the machine or dispenser if not entered on the keypad or other input device connected to the vending machine after a predetermined length of time. The sequence may also be made to cease to actuate the vending machine after a predetermined number of uses.

Thus, there has been provided in accordance with the invention a method to activate a vending machine or other automatic dispenser that fully satisfies the objects, aims and advantages set forth above. While the invention has been described in conjunction with specific embodiments thereof, it is evident that many alterative, modifications and variations will be apparent to those skilled in the art in light of the foregoing description. Accordingly, it is intended to embrace all such alternatives, modifications and variations as fall within the spirit and broad scope of the invention.

What is claimed is:

1. A method of activating a vending machine or automatic dispenser of products or services, comprising the steps of:

providing at least one dispensing device;

providing a remotely located calculating device;

running a first synchronous math function or lookup table in the said at least one dispensing device to produce a first solution and running a second synchronous math function or lookup table in the said remotely located calculating device to produce a second solution, the first solution and the second solution being identical to one another, conveying the second solution running in the remotely located calculating device to a purchaser;

receiving the second solution from the purchaser at the at least one dispensing device;

confirming at the at least one dispensing device that the second solution is identical to the first solution; and activating the dispensing device to dispense the product or service.

2. A system for activating a vending machine or automatic dispenser of products or services, said system comprising:

an authorization acceptance means that operates in the machine or dispenser;

an authorization issuance means that operates independently and in synchrony with said authorization acceptance means and has no network connection to said authorization acceptance means;

a first solution produced by said authorization issuance means;

a second solution produced by said authorization acceptance means at about the same point in time and identical to said first solution; and wherein said authorization acceptance means receives said first solution and compares said first solution and said second solution and, where said first solution and said second solution are identical, said authorization acceptance means authorizes the vending of a product or service; and where said first solution and said second solution are other than identical, said authorization acceptance means takes at least one action from the set of actions of providing a notice of an invalid solution, inviting a new receiving of said first solution, and inviting a problem report.

3. A system as claimed in claim 2 wherein said vending machine or automatic dispenser of products further comprises a keypad entry device and wherein said authorization acceptance means receives said first solution via said keypad entry device.

4. A system as claimed in claim 2 wherein said vending machine or automatic dispenser of products further comprises a wireless receiver entry device and wherein said authorization acceptance means receives said first solution via said wireless receiver entry device.

5. A system as claimed in claim 4 wherein said wireless receiver entry device comprises an infrared receiver entry device.

6. A system as claimed in claim 4 wherein said wireless receiver entry device comprises an audio receiver entry device.

7. A system as claimed in claim 4 wherein said wireless receiver entry device comprises a radio receiver entry device.

8. A method of activating by a purchaser a vending machine or automatic dispenser of products or services, the method comprising the steps of:

(a) providing at least one dispensing device running a first solution generating means to produce a first solution which varies in time;

(b) providing a remotely located calculating device running a second solution generation means independent of said first solution means to produce a second solution identical to said first solution at a given point in time, said second solution generation means having no network connection to said first solution generating means;

(c) conveying said second solution to the purchaser;

(d) receiving at the at least one dispensing device; an input solution via an action of the purchaser;

(e) checking at the at least one dispensing device that said received input solution is identical to said first solution; and (f) in the case that the received input solution is identical to said first solution, then activating the dispensing device to dispense the product or service; and (g) in the case that the received input solution is not identical to said first solution, then avoiding activating the dispensing device to dispense the product or service.

9. A method as claimed in claim 8 wherein said conveying step comprises using at least one of the set of a telephone, a cellular telephone, and a handheld computer.

10. A method as claimed in claim 8 wherein said first solution means comprises at least one of a math function and a table lookup.

11. A method as claimed in claim 8 wherein said second solution means comprises at least one of a math function and a table lookup.

12. A method as claimed in claim 8 wherein said action of the purchaser comprises entering said input solution via a keypad on said at least one dispensing device.

13. A method as claimed in claim 8 wherein said action of the purchaser comprises entering said input solution via triggering a wireless transmission to said at least one dispensing device.

14. A method as claimed in claim 13 wherein said wireless transmission comprises an infrared transmission.

15. A method as claimed in claim 13 wherein said wireless transmission comprises an audio transmission.

16. A method as claimed in claim 13 wherein said wireless transmission comprises a radio transmission.

17. A method as claimed in claim 8 further having a step immediately following step (g), said following step comprising;

(h) notifying the purchaser that said input function is invalid.

18. A method as claimed in claim 17 further having a step following step (h), said following step comprising:

(i) inviting the purchaser to re-input said function.

19. A method as claimed in claim 17 further having a step following step (h), said following step comprising:

(j) inviting the purchaser to report a problem.

20. An apparatus for use by a purchaser in a system as claimed in claim 2, said apparatus comprising:

said authorization issuance means; and a conveying means for conveying said first solution to the purchaser.

21. A vending machine or automatic dispenser of products or services for use by a purchaser in a system as claimed in claim 2.

* * * * *